(12) United States Patent
Buer et al.

(10) Patent No.: US 8,890,298 B2
(45) Date of Patent: Nov. 18, 2014

(54) EMBEDDED PACKAGE SECURITY TAMPER MESH

(71) Applicant: Broadcom Corporation, Irvine, CA (US)

(72) Inventors: Mark Buer, Payson, AZ (US); Matthew Kaufmann, Morgan Hill, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/925,673

(22) Filed: Jun. 24, 2013

(65) Prior Publication Data

US 2014/0035136 A1 Feb. 6, 2014

Related U.S. Application Data

(62) Division of application No. 12/330,336, filed on Dec. 8, 2008, now Pat. No. 8,502,396.

(60) Provisional application No. 61/012,013, filed on Dec. 6, 2007.

(51) Int. Cl.
*H01L 23/02* (2006.01)
*H01L 23/00* (2006.01)
(Continued)

(52) U.S. Cl.
CPC ............ *H01L 23/573* (2013.01); *H01L 23/576* (2013.01); *G06F 2221/2143* (2013.01); *H01L*
(Continued)

(58) Field of Classification Search
USPC .................. 257/678, 679, 704, 776–778, 922, 257/E23.176, E23.187, E23.188, E23.193
See application file for complete search history.

(56) References Cited

U.S. PATENT DOCUMENTS 4,833,618 A 5/1989 Verma et al.
5,288,949 A 2/1994 Crafts
(Continued)

FOREIGN PATENT DOCUMENTS

EP 0 268 142 A2 5/1988
EP 0 860 882 A2 8/1998
(Continued)

OTHER PUBLICATIONS

International Search Report with Written Opinion of the International Searching Authority for Int'l Patent Application No. PCT/US2008/013477, completed on Jan. 23, 2009, and mailed on Feb. 17, 2009, 13 pages.

(Continued)

*Primary Examiner* — Matthew E Warren
(74) *Attorney, Agent, or Firm* — Sterne, Kessler, Goldstein & Fox PLLC

(57) ABSTRACT

Systems and methods for embedded tamper mesh protection are provided. The embedded tamper mesh includes a series of protection bond wires surrounding bond wires carrying sensitive signals. The protection bond wires are positioned to be vertically higher than the signal bond wires. The protection wires may be bonded to outer contacts on the substrate while the signal bond wires are bonded to inner contacts, thereby creating a bond wire cage around the signal wires. Methods and systems for providing package level protection are also provided. An exemplary secure package includes a substrate having multiple contacts surrounding a die disposed on an upper surface of the substrate. A mesh die including a series of mesh die pads is coupled to the upper surface of the die. Bond wires are coupled from the mesh die pads to contacts on the substrate thereby creating a bond wire cage surrounding the die.

8 Claims, 8 Drawing Sheets

(51) Int. Cl.
*H01L 23/16* (2006.01)
*H01L 23/31* (2006.01)
*G06F 21/87* (2013.01)

(52) U.S. Cl.
CPC ...... 2224/49171 (2013.01); *H01L 2924/00014* (2013.01); *H01L 23/16* (2013.01); *H01L 2924/14* (2013.01); *H01L 24/48* (2013.01); *H01L 2924/01057* (2013.01); *H01L 2924/01033* (2013.01); *H01L 2924/01006* (2013.01); *H01L 23/3128* (2013.01); *G06F 21/87* (2013.01); *H01L 2224/0401* (2013.01); *H01L 2924/15311* (2013.01); *H01L 24/06* (2013.01); *H01L 2924/30105* (2013.01); *H01L 2224/85399* (2013.01); *H01L 2924/16195* (2013.01); *H01L 2924/15331* (2013.01); *H01L 2924/01015* (2013.01); *H01L 24/49* (2013.01); *H01L 2224/48091* (2013.01); *H01L 2924/014* (2013.01); *H01L 2924/01005* (2013.01); *H01L 2224/48227* (2013.01); *H01L 2224/05599* (2013.01); *H01L 2224/49431* (2013.01); *H01L 2924/01047* (2013.01); *Y10S 257/922* (2013.01)
USPC ..... 257/679; 257/704; 257/922; 257/E23.176

(56) References Cited

U.S. PATENT DOCUMENTS

| | | | |
|---|---|---|---|
| 5,723,906 A | 3/1998 | Rush | |
| 5,861,662 A | 1/1999 | Candelore | |
| 6,496,119 B1 | 12/2002 | Otterstedt et al. | |
| 6,858,945 B2 | 2/2005 | Rakshani | |
| 6,930,381 B1 | 8/2005 | Cornelius | |
| 7,158,986 B1 | 1/2007 | Oliver et al. | |
| 7,259,457 B2 | 8/2007 | Zhang et al. | |
| 7,343,626 B1 | 3/2008 | Gallagher | |
| 7,539,632 B1 | 5/2009 | Chakrabarti et al. | |
| 7,723,998 B2 | 5/2010 | Doi | |
| 7,836,051 B1 | 11/2010 | Mason | |
| 7,868,441 B2 * | 1/2011 | Eaton et al. | 257/686 |
| 7,925,691 B2 | 4/2011 | Westphal | |
| 8,502,396 B2 | 8/2013 | Buer et al. | |
| 2004/0227549 A1 | 11/2004 | Solie | |
| 2005/0102358 A1 | 5/2005 | Gold et al. | |
| 2006/0123376 A1 | 6/2006 | Vogel et al. | |
| 2006/0195442 A1 | 8/2006 | Cone et al. | |
| 2006/0253579 A1 | 11/2006 | Dixon et al. | |
| 2006/0253583 A1 | 11/2006 | Dixon et al. | |
| 2007/0011023 A1 | 1/2007 | Silverbrook | |
| 2007/0155328 A1 | 7/2007 | Turner | |
| 2007/0235846 A1 | 10/2007 | Lee et al. | |
| 2008/0109473 A1 | 5/2008 | Dixon et al. | |
| 2008/0126176 A1 | 5/2008 | Iguchi | |
| 2008/0172382 A1 | 7/2008 | Prettejohn | |
| 2008/0278217 A1 | 11/2008 | Hankhofer et al. | |
| 2009/0024605 A1 | 1/2009 | Yang | |
| 2009/0077669 A1 | 3/2009 | Buer | |
| 2009/0112974 A1 | 4/2009 | Ravikumar et al. | |
| 2009/0146270 A1 | 6/2009 | Buer et al. | |
| 2009/0216577 A1 | 8/2009 | Killebrew | |
| 2009/0222907 A1 | 9/2009 | Guichard | |
| 2012/0256305 A1 | 10/2012 | Kaufman et al. | |

FOREIGN PATENT DOCUMENTS

| | | |
|---|---|---|
| EP | 1 670 059 A1 | 6/2006 |
| JP | 09-27512 A | 1/1997 |
| WO | WO 2007/091210 A2 | 8/2007 |

OTHER PUBLICATIONS

Notification Concerning Transmittal of International Preliminary Report on Patentability for International Application No. PCT/US2008/013477, dated Jun. 17, 2010, 7 pages.

European Search Report for related European Patent Application No. 08 85 6321, European Patent Office, Munich, Germany, mailed Feb. 6, 2014; 7 pages.

European Search Report for related European Patent Application No. 08 85 6321, European Patent Office, Munich, Germany, mailed Jan. 24, 2014; 3 pages.

English-language Abstract of Japanese Patent Application Publication No. 09-27512; 2 pages.

* cited by examiner

EMBEDDED PACKAGE SECURITY TAMPER MESH

CROSS-REFERENCE TO RELATED APPLICATIONS

This application is a continuation of U.S. patent application Ser. No. 12/330,336, filed on Dec. 8, 2008, which claims the benefit of U.S. Provisional Application No. 61/012,013, filed on Dec. 6, 2007, both of which are incorporated herein by reference in their entireties.

FIELD OF THE INVENTION

This invention generally relates to the security of integrated circuit devices and specifically to physical security of integrated circuit devices.

BACKGROUND OF THE INVENTION

Certain types of devices are targets for sophisticated attacks. For example, chips storing cryptographic keys or other secure data or chips performing secure transactions (e.g., credit card transactions) are particularly attractive to attackers. One style of physical attacks, referred to as an enclosure attack, involves penetrating the device enclosure to physically access the device. In these physical attacks, the package is opened and any encapsulating material is removed or etched away. The attacker then accesses the internals of the chip or device using a probe. The attacker can then observe and/or manipulate the internal chip signals.

What is therefore needed is package level security combining logical protection, embedded physical security measures, and active tamper detection for critical data and signals.

BRIEF DESCRIPTION OF THE FIGURES

The accompanying drawings, which are included to provide a further understanding of the invention and are incorporated in and constitute a part of this specification, illustrate embodiments of the invention and together with the description serve to explain the principles of the invention. In the drawings.

The present invention will now be described with reference to the accompanying drawings. In the drawings, like reference numbers may indicate identical or functionally similar elements

DETAILED DESCRIPTION OF THE INVENTION

1.0 Overview

Figure 1:
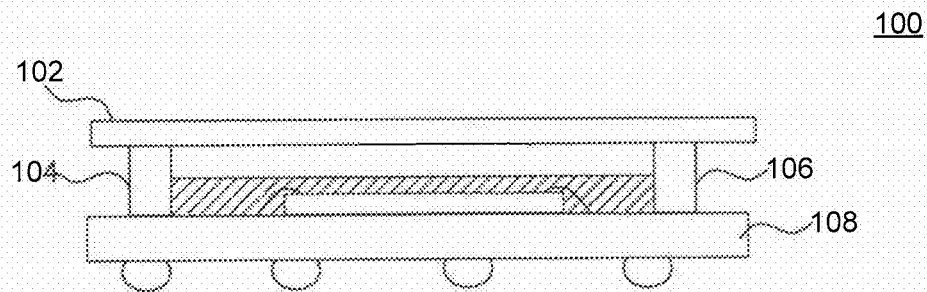
FIG. 1 depicts an exemplary conventional technique for package protection.

Critical components of a chip or device may be attacked from the top, sides, or bottom of its package. Conventional techniques to protect against these physical attacks, particularly those that do not provide logical protection of critical signals, construct a box around one or more chips. FIG. 1 depicts such an exemplary conventional technique for package protection. As depicted in FIG. 1, package 100 has a top circuit board 102, a first side circuit board 104 mounted at a 90 degree angle to circuit board 102, a second side circuit board 106 also mounted at a 90 degree angle to circuit board 102, and a bottom circuit board 108. A grid mesh is run through the circuit board enclosure. The enclosure acts to surround all the protected components (referred to as a "bag of chips"). This technique is difficult and expensive to manufacture.

Embodiments of the present invention described herein provide protection against attacks from the top, bottom, and/or side of the package. The bond wire protection embodiments described in Section 2 provide protection against and detection of attacks from the side of a package. The top protection embodiments (e.g., the stacked die and package-on-package) embodiments described in Section 4 below provide protection against and detection of attacks to the top of the package. The package-on-package embodiments described in Section 4 also provide physical protection against side attacks. Protection from bottom attacks may be provided via a board level mesh located in the substrate onto which the die is attached. A board level mesh may be provided using normal manufacturing techniques.

2.0 Bond Wire Protection

Figure 2:
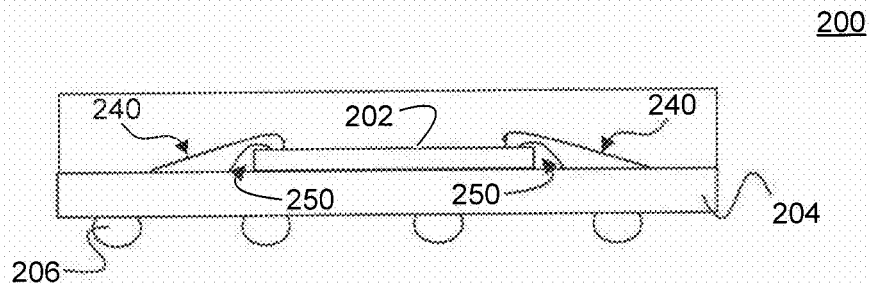
FIG. 2 depicts a cross-section of an exemplary package having bond wire package security, according to embodiments of the present invention.

FIG. 2 depicts a cross-section of an exemplary package 200 having bond wire package security, according to embodiments of the present invention. Bond wire package security effectively creates a wire cage or grid of protection bond wires surrounding bond wires carrying sensitive chip signals. This cage of protection bond wires increases the difficulty of attaching a probe to the protected signal without detection.

Package 200 includes one or more integrated circuit (IC) dies 202 mounted on a substrate 204. In an embodiment, die 202 is an integrated security processor having an embedded system on chip processor and multiple peripheral devices. For example, the die may include sensitive input/output devices such as a magnetic strip reader, smartcard input/output, credit card reader, secure keypad, and/or touch screen. In an embodiment, the package substrate is a multi-layer board (e.g., 4-layer) and is used to route wire bonded signals to package balls 206.

In an embodiment, package 200 uses staggered pads in the I/O pad ring of the device. Pads for sensitive (or protected) signals (also referred to as "signal pads") are placed on stagger-out pads (not shown). Stagger-out pads are on the farthest edge of the die. The protective bond mesh is implemented on stagger-in pads adjacent to the stagger-out pads. Stagger-in pads (not shown) are located behind the stagger-out bond pads and stagger-out (or "signal") bond wires 250. The stagger-in bond wires (also referred to as "protection bond wires") 240 are shaped so that they are vertically higher than the stagger-out bond wires. The protection bond wires therefore provide both vertical and horizontal protection of the stagger-out (sensitive signal) pads and bond wires 250. These sensitive signals are routed into the substrate before leaving the protective cage created by the protection wire bonds. As illustrated in FIG. 2, the design creates a cage of protection bond wires that surround and protect the sensitive signals.

The stagger-in protective pads (not shown) are constructed using a wire pad. The wire pad has no connection to the substrate or power planes of adjacent pads. The protective pads are only connected to isolated metal and isolated vias on the die. In an embodiment, the protection bond wires 240 are connected to form one or more protection circuits. A tamper signal is driven through each protection circuit to a detection circuit. For additional security, the driving pad(s) of the protection circuit may be driven from a protected security area of die 202 (such as described in Section 3.0 below). The detection circuit may be configured to detect a cut or short in the protection circuit. A detection circuit may also be configured to detect changes to other characteristics of the protection circuit such as capacitance or resistance changes.

Signals that leave the chip (via signal bond wires 250) may be logically protected using encryption and authentication techniques. Package 200 may also include integrated physical protection including frequency monitoring, voltage monitoring, temperature sensors, and a sensor mesh which protects the chip in certain sensitive areas.

As would be appreciated by persons of skill in the art, solder balls 206 are arranged in a pattern having a plurality of rows. In embodiments, security sensitive signals are placed at least two rows deep from the outside of the ball array. Less sensitive signals may be ideally placed at least one row deep from the outside of the package.

Figure 3:
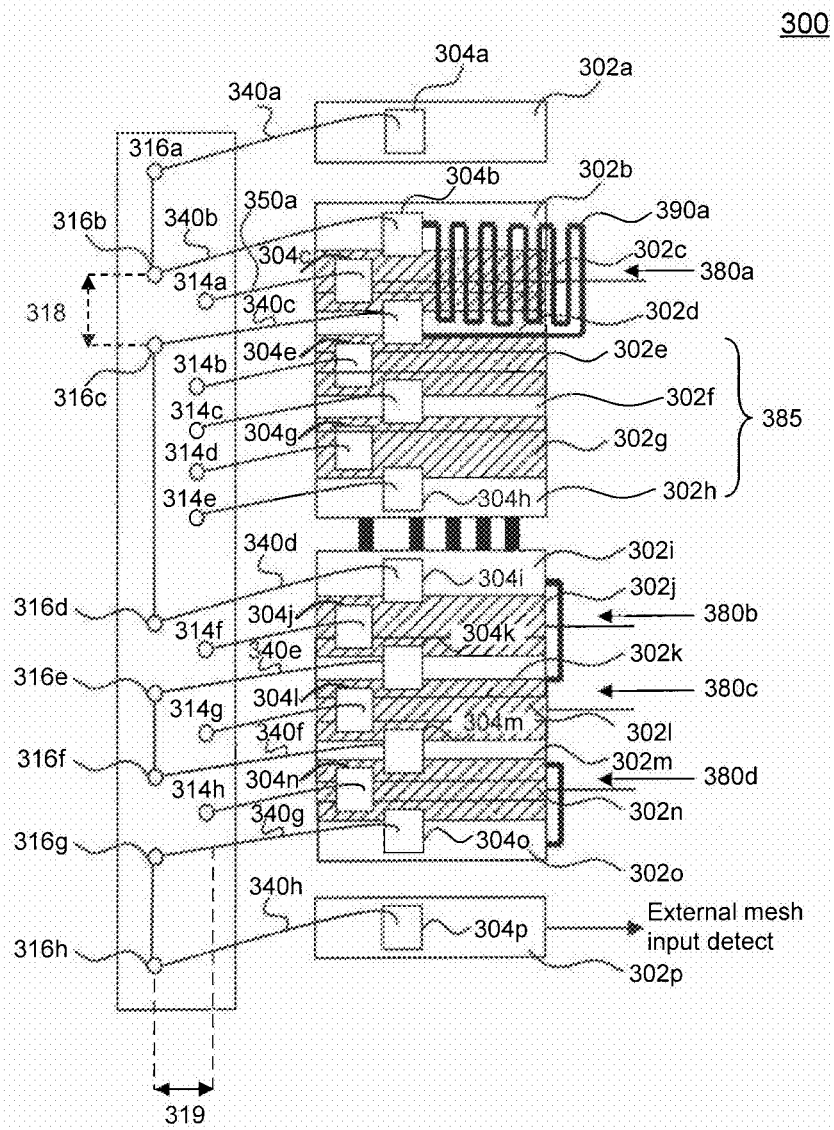
FIG. 3 depicts a top view of a portion of an exemplary package, according to embodiments of the present invention.

FIG. 3 depicts a top view of a portion of an exemplary package 300, according to embodiments of the present invention. Package 300 includes a plurality of pads 302a-p on a die (e.g., die 202 of FIG. 2). In an embodiment, pads 302 are positioned in a ring configuration (note that only a portion of the ring is depicted in FIG. 3). A pad 302 typically includes a pad contact 304. A set of pads 302 are used for wire bond protection (referred to as "protection pads"). The remaining pads 302 (shaded in FIG. 3) may be used for chip functions. For example, pads 302c, e, g, j, l, and n are chip function (stagger-out) pads and the remaining pads are protection (stagger-in) pads.

Although depicted as stagger-in pads, the mesh connection pads may be optionally stagger-in or stagger-out. A staggered configuration of pads allows for a higher density of pins which in turn allows the protection bond wires to be placed closer to one another, increasing the physical protection of the surrounded signal bond wire. In addition or alternatively, mesh connection pads may be in-line bond pads. Additionally, as depicted in FIG. 3, pads may be optionally overlapped.

FIG. 3 also depicts a portion of the package substrate that provides routing for the package. In an embodiment, routing is provided by a small printed circuit board (PCB) on the substrate. As illustrated in FIG. 3, the package substrate includes a set of outer contacts 316a-h and a set of inner contacts 314a-h. A pad landing 304 on the die may be coupled to a substrate contact via a wire bond. Substrate contacts are typically connected to solder balls 206 (shown in FIG. 2).

Protection wires 340a-n are typically bonded to the set of outer contacts 316. A bond wire carrying a physically protected signal, such as signal 380a, typically has a protection bond wire on each side. The effective vertical mesh spacing 318 between the outer substrate contacts for these protection wires is determined by the minimum spacing between protective (stagger-in) pads and a signal (stagger-out) pad. In the example shown in FIG. 3, a first physically protected signal 308a is routed from pad contact 304c to substrate inner contact 314a via signal bond wire 350a. To access substrate inner contact 314a, an attacker must fit a probe between protection wire bonds 340b and 340c. Therefore, the smaller the vertical mesh spacing the closer the protection wire bonds can be, resulting in greater physical protection for signal 308a. Vertical mesh spacing can also be decreased by increasing the horizontal spacing 319 between the substrate outer contacts 316 and the substrate inner contacts 314.

Figure 4:
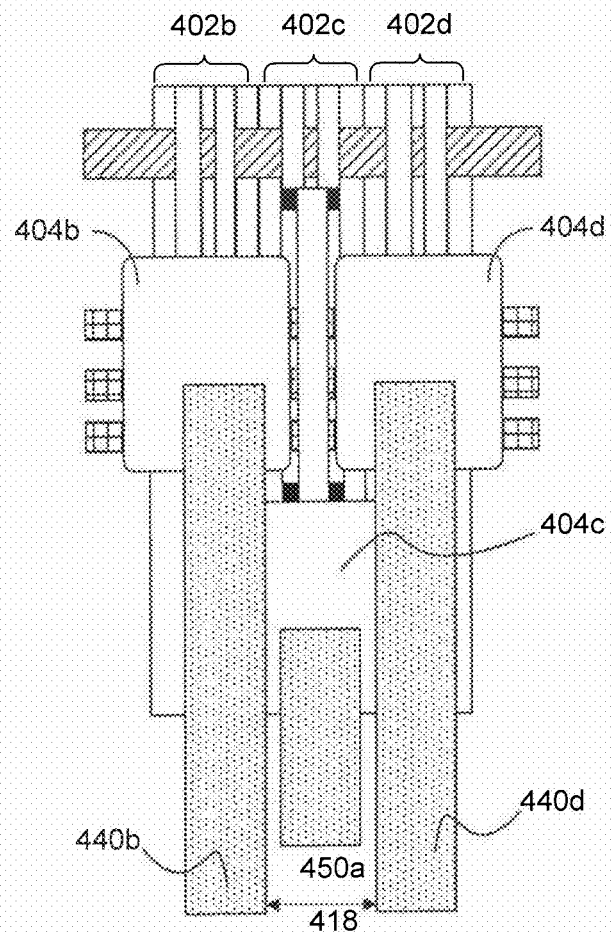
FIG. 4 depicts a top view of adjacent stagger-pads, according to embodiments of the present invention.

FIG. 4 depicts a top view of adjacent stagger-pads, according to embodiments of the present invention. Stagger-pad 402c is a sensitive signal (stagger-out) pad and receives a protected signal (e.g., signal 308a). Stagger-pads 402b and 402d are protection (stagger-in) pads. In the exemplary embodiment depicted in FIG. 4, stagger-pads 402b-d are not overlapped. Protection bond wires 440b and 440c are vertically higher than signal bond wire 450a. In an embodiment, stagger-pads 402 are 30 µm wide and the protective and signal bond wires are 0.9 mils thick, creating an effective bond wire spacing 418 of 37.14 µm between the two protective bond wires. The horizontal spacing in this embodiment is only 7.14 µm.

As depicted in FIG. 3, protective (stagger-in) bond wires (e.g., bond wires 340b and 340c) protect a signal bond wire (e.g., signal bond wire 350a), the signal pad landing (e.g., 304c), and signal trace for the sensitive signal (stagger-out) pad. Additionally, the circuit connections between protective (stagger-in) pads on the die are connected to cover the signal trace of the stagger-out pad. In an embodiment, the connection may be patterned (e.g., in a zig zag) such as connection 390a. The use of a pattern trace allows additional physical protection of sensitive signal traces on the die.

In the exemplary package 300, a set of signals 380a-d have been designated for physical protection. Another set of signals 385 have been designated as not requiring additional physical protection. These signals may be protected by logical security and/or may have been deemed to not require additional physical security. As shown in FIG. 3, a protection circuit is created around one or more of the physically protected signals 380a-d. The protection circuit of FIG. 3 forms a zig zag pattern when viewed from the top.

In the protection circuit illustrated in FIG. 3, the driver (e.g., an external mesh driving circuit) is coupled to driving pad 302a. An exemplary mesh driving circuit is described in U.S. patent application Ser. No. 12/210,013, entitled "Mesh Grid Protection," which is incorporated herein by reference in its entirety. Driving pad 302a may be driven from an external mesh driving circuit located in a security area on the die. Driving pad 302a is always active regardless of the state of the signals to be protected (powered or un-powered).

The driving pad 302a may be routed as a wire only connection between driving pad 302a and detection pad 302p. The wire is created using a bond wire to connect driving pad 302a (via pad landing 304a) to substrate contact 316a. Substrate contact 316a is connected to substrate 316b via a connection in the package substrate. A protection wire bond connects substrate contact 316b to protective pad 302b on the die. In an embodiment, pad 302b is an analog pad not tied to the substrate. The use of an analog pad in the protection circuit enables two different voltage levels to be used. Using this configuration, the protection/tamper detection circuit can remain active when the rest of the chip is powered off.

The pad landing 304b is connected to pad landing 304d using a metal connection (e.g., connected trace) on the die. As discussed above, this metal connection provides additional physical security for the signal trace carrying protected signal 380a. Signal pad 302c, between protective pads 302b and d, receives physically protected signal 380a. A bond wire connects protection pad 302d to substrate contact 316c which is connected to substrate contact 316d. Thus, the protection circuit effectively bypasses the unprotected signals 385. A wire bond connects substrate contact 316d to protection pad 302i which is connected to protection pad 302k using a metal connection which is then wire bonded off die to substrate contact 316e. The signal bond wire carrying physically protected signal 380b is surrounded by protection bond wires 340d and 340e. This zig zag pattern continues until the last substrate outer contact 316h is bonded to detection pad 302p, creating the tamper detection circuit. The signal from the detection pad 304p is routed to an external detection circuit. An exemplary external detection circuit is described in U.S. patent application Ser. No. 12/210,013. In an embodiment, the zig zag mesh pattern is extended to cover the entire die.

A pad ring, a portion of which is depicted in FIG. 3, may have one or more gaps. The gap may serve to isolate a pad or set of pads. For example, no connectivity is provided between pad 302a and pad 302b over the pad gap. In this embodiment, pad 302a may be on a different power plane than pad 302b. Alternatively, connectivity may be provided across the gap such as is shown in the gap between pads 302h and 302i.

FIG. 3 depicts a single protection circuit for multiple physically protected signals. As would be appreciated by persons of skill in the art, multiple protection circuits may be used on a chip. For example, a user may want tamper detection around each sensitive signal. This configuration would allow the detection of an attacker attempting to access one device/function (e.g., a magnetic stripe reader) versus another device/function (e.g., secure key pad). Note that in alternate embodiments, the chip may have only a single protection circuit for the entire chip.

Figure 5:
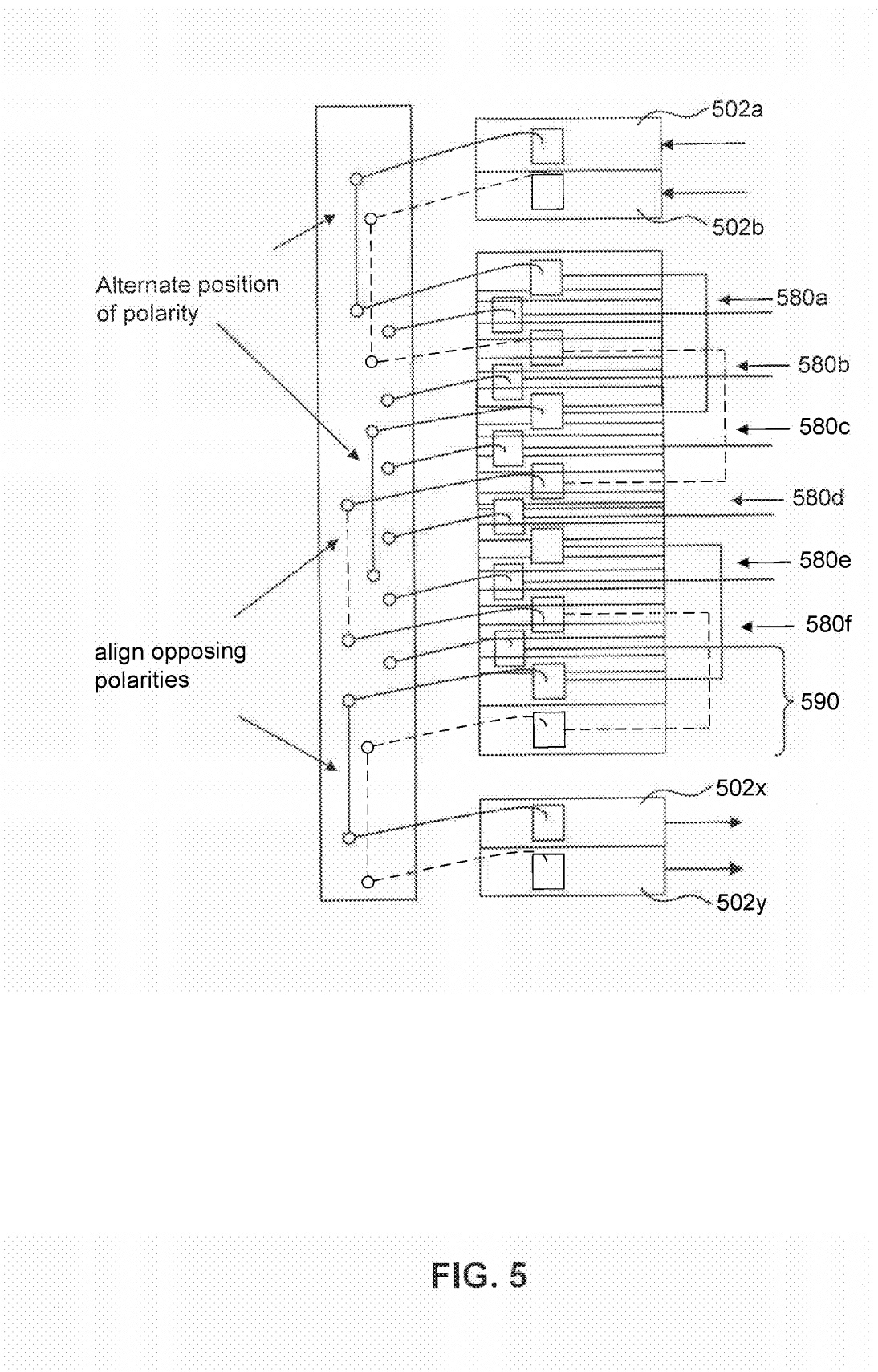
FIG. 5 depicts a top view of a portion of an exemplary package having multiple tamper detection circuits, according to embodiments of the present invention.

FIG. 5 depicts a top view of a portion of an exemplary package 500 having multiple tamper detection circuits, according to embodiments of the present invention. FIG. 5 specifically illustrates a view of connections between protective pads using two different polarity drivers. Connections having a first polarity are depicted as a solid line. Connections having the second polarity are depicted as a dashed line.

Package 500 includes two driving pads 502a, b (one for each polarity) and two detection pads 502x, y (one for each polarity). The detection circuits are configured to provide bond wire protection for sensitive signals 580a-f.

Because there are two separate tamper detection circuits (complete wires), an even number of on/off pads 590 are needed around the protected signal areas as shown in FIG. 5. In an embodiment, the final pads around a signal area may be routed back off the die to prevent a long signal trace from one protected pad area to the next.

Additionally, the two tamper detection circuit routes on the package may be alternated from being on the inside to the outside for connection to the next bond wire. This configuration prevents an attacker from shorting the signal at the package substrate layer. The metal connections on the die may similarly be alternated. The opposing tamper detection circuit polarities may further be aligned in the horizontal plane of the die and package to make bypass of the signals difficult.

3.0 Die Mesh Protection

Figure 6:
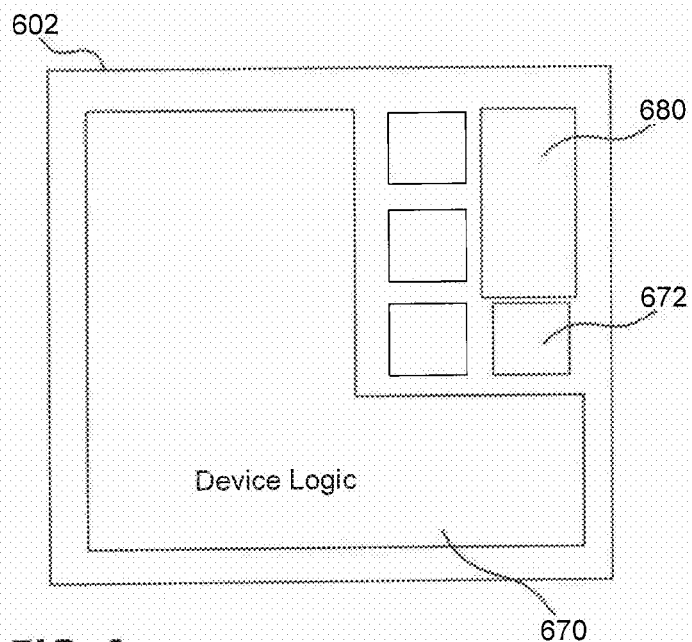
FIG. 6 depicts an exemplary die having a detection mesh grid above a portion of the die, according to embodiments of the present invention.

A die, such as die 202 depicted in FIG. 2, may also include a variety of internal mesh protections. FIG. 6 depicts an exemplary die 602 having a detection mesh grid above a portion of the die, according to embodiments of the present invention. Die 602 includes device logic 670, optional scratch battery backed RAM (BBRAM) 672, and a mesh grid 680 positioned into the corner of die 602. The mesh grid 680 covers a secure area of the die. The mesh grid provides at least a dual layer detection grid. The corner position is organized to make it more difficult for an attacker to etch back the package without destroying the bond wires for the power supply to the BBRAM. Additionally, positioning away from the dynamic logic of the device provides thermal isolation if a temperature monitor is included in the secure area of the die. As would be appreciated by persons of skill in the art, mesh grid 680 (and its associated secure area) may be located anywhere on the die.

Die 602 may also include a single or dual layer metal mesh above the active die area. The additional metal layer(s) may be driven by tamper detection signals from tamper logic located in the secure area of the die.

Figure 7:
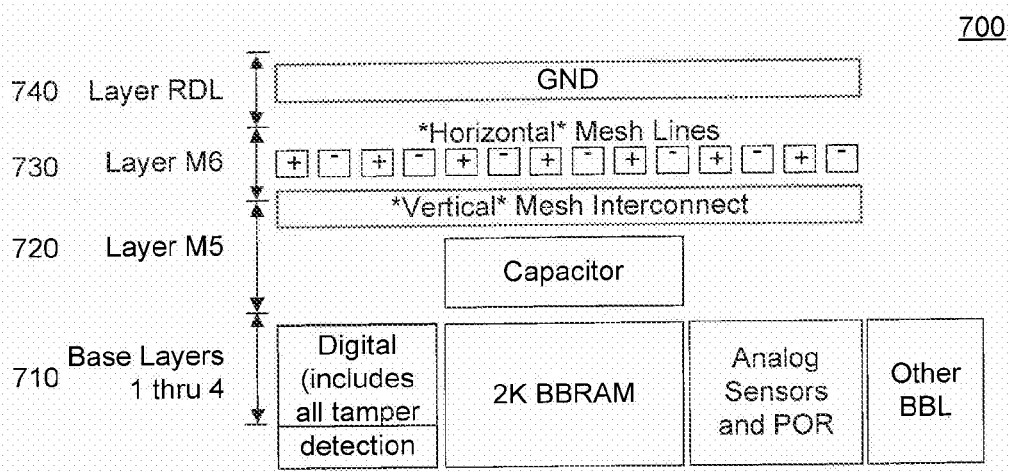
FIG. 7 depicts a cross section of the secure area of a die, according to embodiments of the present invention.

FIG. 7 depicts a cross section of the secure area 700 of a die, according to embodiments of the present invention. Secure area 700 includes an RDL layer 740, a M6 layer 730, an M5 layer 720, and base layers 710. Secure area 700 is protected by a metal layer 6 (M6) 730 grid, where connections to the grid are made in layer M5 720. Grid connections are always under the protective grid. RDL layer 740 provides a ground plane above the active grid of layer M6 730. The ground plane provides a physical blind as well as a short path to ground that can be detected with the M6 layer grid.

Figure 8:
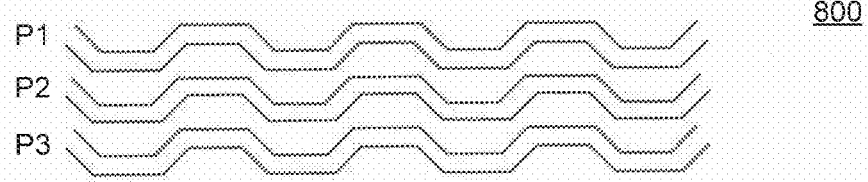
FIG. 8 depicts an exemplary protective mesh pattern, according to embodiments of the present invention.
Figure 9:
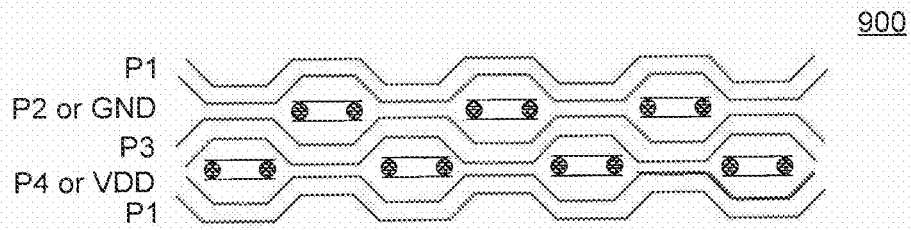
FIG. 9 depicts another exemplary protective mesh pattern, according to embodiments of the present invention.

FIG. 8 depicts an exemplary protective mesh pattern 800, according to embodiments of the present invention. Protective mesh pattern 800 uses a zig-zag between opposing polarities. FIG. 9 depicts another exemplary protective mesh pattern 900, according to embodiments of the present invention. This pattern takes advantage of additional polarities to increase the difficulty for a hacker to successful bypass the mesh. Adding an additional layer over the mesh shown in FIG. 9 where P2 and P4 are placed over the minimum spaced P1 and P3 signals and the pattern repeated but offset, further complicates the jumper process for an attacker.

Figure 10:
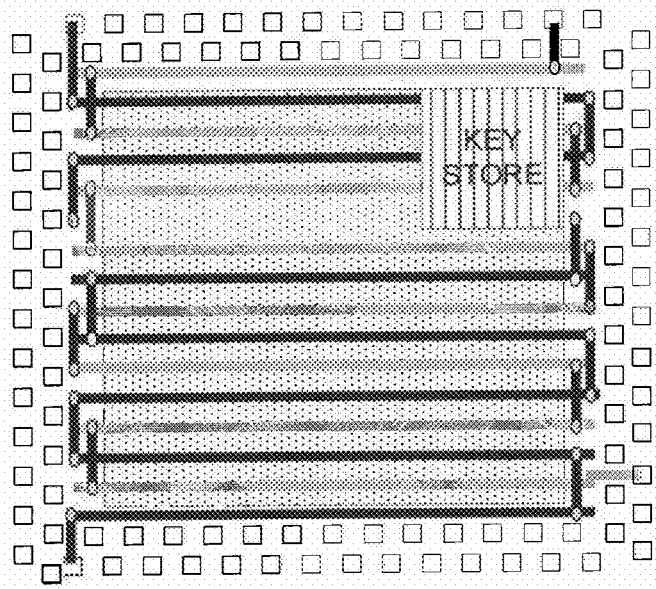
FIG. 10 depicts a single layer protective mesh, according to embodiments of the present invention.

FIG. 10 depicts a single layer protective mesh 1000, according to embodiments of the present invention. Mesh 1000 is implemented in a more complex pattern, making bypass more difficult. In an embodiment, mesh 1000 is built in RDL. In this embodiment, wire pads are connected in layer M6 for driving and detecting the tamper circuit made by the mesh wire. Alternatively, single layer mesh 1000 may be planned by adding a via layer between M6 driver and detection pads, using M7 as the connection layer, and RDL as the mesh.

Additionally, a dual layer mesh can be utilized provided the upper layer mesh protects the lower layer mesh connections. Ideally, the upper layer mesh connections are protected by the lower layer mesh.

4.0 Package Level Protection

The bond wire protection described above provides protection against attacks to the package from the sides or at angles. However, an attacker can also attack a package from the top (e.g., to place a tap inside the die). Techniques are required to increase the difficulty of such attacks as well as to detect top attacks and take protective action such as erase sensitive information (e.g., cryptographic key material).

FIGS. 11-16 depict embodiments of package level protection, according to embodiments of the invention. Package level protection can be used in combination with the bond wire protection and/or the die mesh protection described above. Alternatively, package level protection can be used alone. Package level protection can be provided via a stacked die approach (described in Section 4.1) or via a package-on-package approach (described in Section 4.2).

Typically, protection from and detection of top attacks to the package are provide via a mesh grid located on the die. A limitation of these internal die mesh techniques is that mesh grid protection is required to be manufactured in every die, regardless of the needs of the customer. The embodiments depicted in FIGS. 13-16 provide mesh grid protection separate from the die. In these embodiments, the mesh grid protection is provided as part of the package, external to the die.

4.1 Stacked Die Approach

Figure 11:
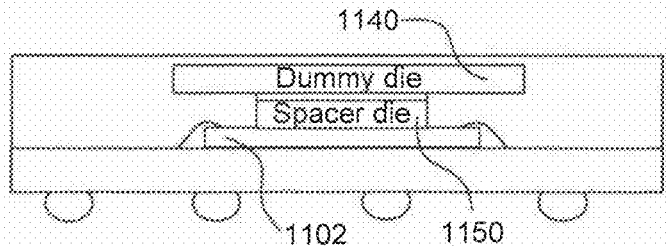
FIGS. 11 and 12 depict stacked die embodiments having mechanical only security protection.
Figure 12:
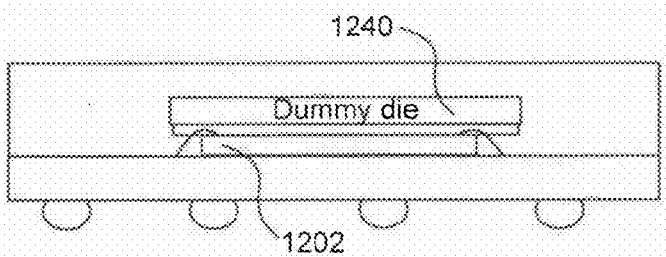

FIGS. 11 and 12 depict stacked die embodiments having mechanical only security protection. Package 1100 of FIG. 11 includes a dummy die 1140 having an area equal to or greater than the area of die 1102. Dummy die 1140 is separated from die 1102 by a spacer die 1150. Therefore, to access die 1102, an attacker must physically remove all or a portion of dummy die 1140 and spacer die 1150. Package 1200 of FIG. 12 includes a dummy die 1240 having an area equal to or greater than the area of die 1202. Dummy die 1240 is stacked directly on die 1202. That is, package 1200 does not include a spacer die. The embodiments of FIGS. 11 and 12 provide only physical protection. Therefore, the security features of these packages can be destroyed without detection. These embodiments primarily increase the difficulty of top attacks.

Figure 13:
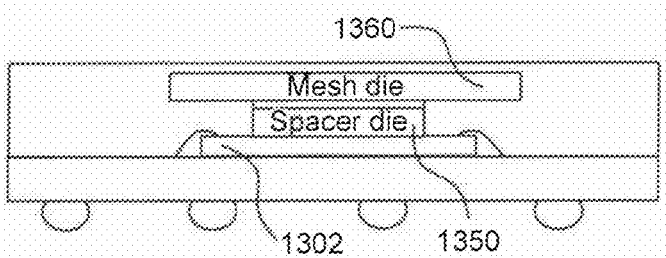
FIGS. 13 and 14 depict stacked die protection embodiments, according to embodiments of the invention.
Figure 14:
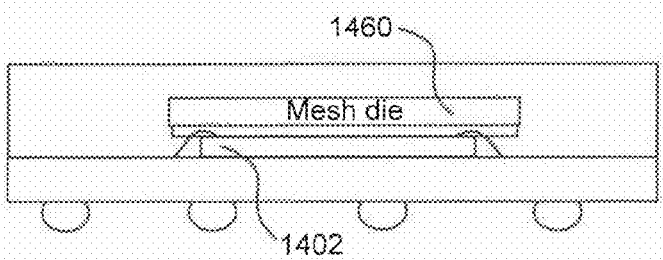

FIGS. 13 and 14 depict stacked die protection embodiments, according to embodiments of the invention. Packages 1300 and 1400 include a mesh die 1360, 1460 having an area equal to or greater than the area of die 1302, 1402. Thus, mesh die 1360, 1460 provides a multi-layer protective mesh over the entire lower die 1302, 1402. In the embodiment of FIG. 13, mesh die 1360 is separated from die 1302 by a spacer die 1350. In the embodiment of FIG. 14, mesh die 1460 is stacked directly on die 1402. In an embodiment, mesh die 1360, 1460 includes a mesh grid. The bond wires 1320, 1420 in packages 1300 and 1400 respectively surround the entire die and provide connection between the substrate and the mesh die. Bond wires 1320, 1420 provide greater protection than a solder ball surround (as described below for FIGS. 15 and 16) because they can be spaced closer together than solder balls.

The stacked die embodiments of FIGS. 13 and 14 provide mesh protection over the entire die using the top mesh die 1360, 1460 as a mesh. In these embodiments, the mesh grid may be driven from the protected lower die 1302, 1402 using an external mesh driving circuit. In embodiments, additional functionality (e.g., memory) may be provided in top mesh die 1360, 1460.

4.2 Package on Package Approach

Figure 15:
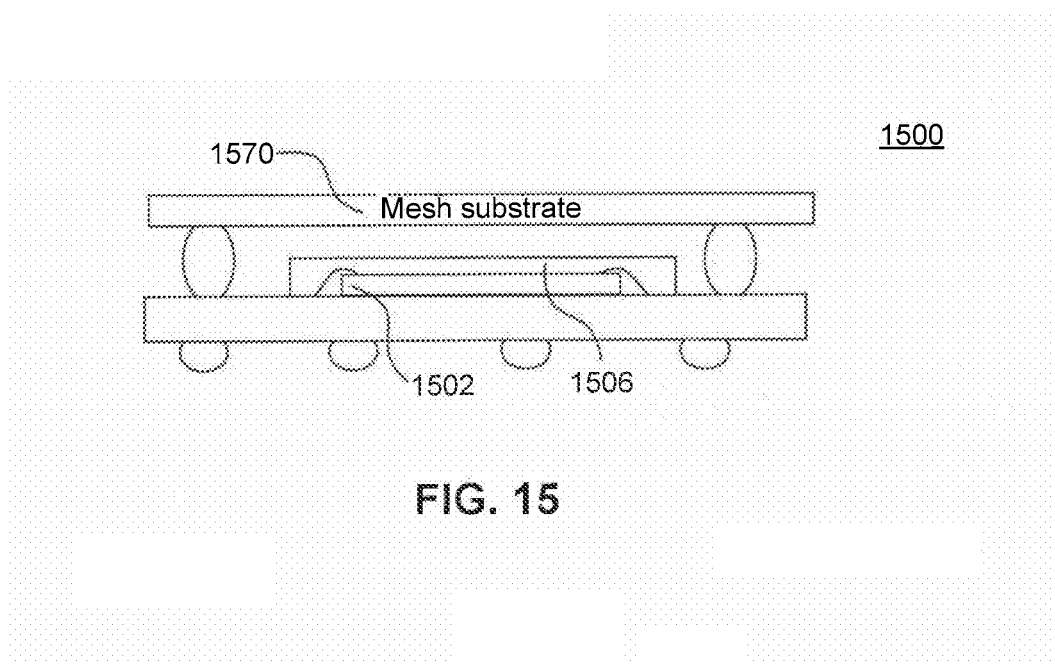
FIGS. 15 and 16 depict exemplary package-on-package approaches, according to embodiments of the present invention.
Figure 16:
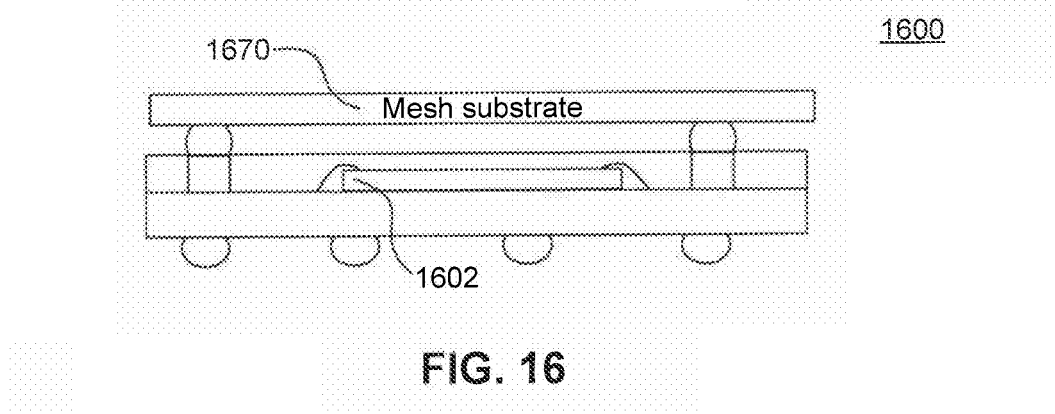

FIGS. 15 and 16 depict exemplary package-on-package approaches, according to embodiments of the present invention. In these embodiments, a mesh substrate having a mesh grid is utilized to protect the die 1502, 1602. In package 1500, die 1502 is surrounded by a ball grid array coupled to mesh substrate 1570. Additionally, die 1502 is encased in an encapsulate 1506. Encapsulate 1506 is also surrounded by the ball grid array. As would be appreciated by persons of skill in the art, a custom mold cap may be required to mold the encapsulate. The height of the balls in the ball grid array must be greater then the height of the encapsulate. Mesh substrate 1570 is stacked on the ball grid array. The mesh substrate 1570 completely covers die 1502.

In package 1600, no custom molded encapsulate is required. Instead, the ball grid array of mesh substrate 1670 is coupled to spacers in the encapsulate layer on lower substrate 1604. In this embodiment, the height of the balls in the ball grid array is not tied to the height of the die or encapsulate.

The package on package embodiments of FIGS. 15 and 16 provide a mesh over the entire die using a top package mesh substrate. Thus, in these embodiments, no extra die is required. In these embodiments, the multi-layer mesh grid may be driven from the protected lower die using an external mesh driving circuit located in the secure area of the die. Connections to the upper mesh substrate are made using the solder balls between the packages. In an embodiment, the solder balls are placed on all four sides of the package with a minimum ball spacing and having alternating polarity. This configuration of solder balls provides additional protection from side attacks. Therefore, the embodiments of FIGS. 15 and 16 may not be used with wire bond protection embodiments described above.

5.0 Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A secure integrated circuit package, comprising:
a first substrate having an upper surface and a lower surface;
a first plurality of solder balls coupled to the lower surface of the first substrate;
a die coupled to the upper surface of the first substrate;
a plurality of spacers disposed in a first ring around the die;
an encapsulate covering the die and the plurality of spacers;
a second substrate including a mesh protection grid; and
a second plurality of solder balls disposed in a second ring on a lower surface of the second substrate,
wherein the second plurality of solder balls are coupled to the plurality of spacers.

2. The secure integrated circuit package of claim 1, wherein the die includes a secure area.

3. The secure integrated circuit package of claim 2, further comprising:
tamper detection logic, coupled to the mesh protection grid, located in the secure area.

4. The secure integrated circuit package of claim 1, wherein the mesh protection grid comprises:
a multi-layer mesh protection grid.

5. The secure integrated circuit package of claim 2, wherein the secure area of the die comprises:
a mesh driving circuit configured to drive the mesh protection grid.

6. The secure integrated circuit package of claim 5, wherein the second plurality of solder balls are further coupled to the mesh driving circuit.

7. The secure integrated circuit package of claim 1, wherein the second plurality of solder balls have minimal spacing between them.

8. The secure integrated circuit package of claim 1, wherein the second plurality of solder balls have alternating polarity.

* * * * *